United States Patent [19]
Sprung

[11] 3,762,273
[45] Oct. 2, 1973

[54] MILLING MACHINE
[75] Inventor: Douglas L. Sprung, Calgary, Alberta, Canada
[73] Assignee: International Portable Pike Mills, Ltd., Calgary, Alberta, Canada
[22] Filed: Nov. 29, 1971
[21] Appl. No.: 202,774

[52] U.S. Cl............... 90/15 R, 90/58, 144/118, 51/40, 51/56, 83/928, 83/374, 83/488, 83/513
[51] Int. Cl............................................. B23d 15/06
[58] Field of Search................. 90/15 R, DIG. 2, 90/58; 144/117 B, 118; 29/33 S; 51/40, 56; 83/513, 374, 487, 488, 928

[56] References Cited
UNITED STATES PATENTS
1,897,534  2/1933  Simpson................. 83/374
1,832,244  11/1931 Rosenberg............... 51/56
1,933,640  11/1933 Schafer.................. 51/40

FOREIGN PATENTS OR APPLICATIONS
495,401  0/1930  Germany................. 90/15
257,202  1913   Germany................ 90/DIG. 2
35,030   1965   Germany................. 83/488

Primary Examiner—Andrew R. Juhasz
Assistant Examiner—Z. R. Bilinsky
Attorney—W. Irwin Haskett

[57] ABSTRACT

A milling machine for plate edge preparation having a spaced pair of track-carried milling head carriages movable the entire length of the plate and operable to simultaneously machine both side edges of a sheet or laminate plate of substantial thickness. Mounted on each carriage is a transversely adjustable milling head with a powerful intimate motor, as well as a plate edge depressor to dampen chatter and plate flutter. The milling head carriages have track-engaging guide wheels and one of each pair of tracks is adjustable for trueing.

The machine may consist of separable components, transportable on wheeled vehicles, enabling it to be assembled and operated as an independent, self-contained unit in the field.

4 Claims, 10 Drawing Figures

PATENTED OCT 2 1973                        3,762,273

Inventor
DOUGLAS L. SPRUNG

PATENTED OCT 2 1973 3,762,273

Inventor
DOUGLAS L. SPRUNG
Attorney

MILLING MACHINE

This invention relates to improvements in a milling machine and more particularly to a high capacity one suitable for preparing the edges of plate as an entry miller of a pipe mill.

In the edge preparation of steel plate entering a pipe mill, rotary shears and planers may be employed. However, with heavy plate, having a thickness of say ¾ of an inch, it has been found that the shears have a tendency to fracture rather than shear the middle third and furthermore shears can induce camber. Planers, by their nature, are massive and heavy and require that the heads be moved at a high speed if interruption in production is to be avoided.

My present machine is especially suitable as an entry miller for a portable pipe mill as disclosed in my contemporary application Ser. No. 155,148, possessing a number of unique characteristics that render it superior to known edge millers for such a purpose, e.g., its overall compactness, its divisibility into separate units for transport, and its adjustable supports.

Accordingly, an object of the invention is to provide an entry miller for plate edge preparation that consists of a number of separable units that can be readily transported and easily assembled on site.

A further object is to provide a plate edge milling machine with a spaced pair of milling heads that operate to simultaneously mill both sides of a plate.

A further object of the invention is to provide a plate edger with milling heads and tools capable of simultaneously milling both sides of laminated plate stacked to a depth of 6 inches, or more.

A further object of the invention is to provide a plate edge miller with track-carried milling heads operable for the full length of the plate and having intimate milling head power supply to minimize vibration and wherein chatter and plate flutter is prevented by plate edge depressors on the travelling milling head.

A further object of the invention is to provide a track-carried milling head carriage provided with a pair of horizontal guide wheels that laterally engage opposite sides of one of the rails.

A further object of the invention is to provide a plate edge milling machine of broad capability by affording adjustment of the machine bed, the rails and the transverse spacing of the milling heads.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
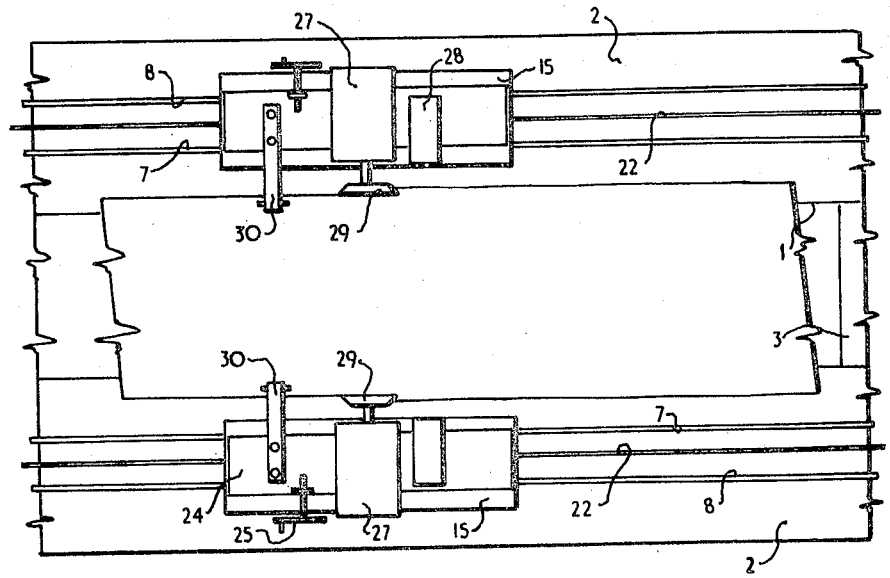
FIG. 1 is a plan view of a preferred embodiment of the plate edge miller.
Figure 2:
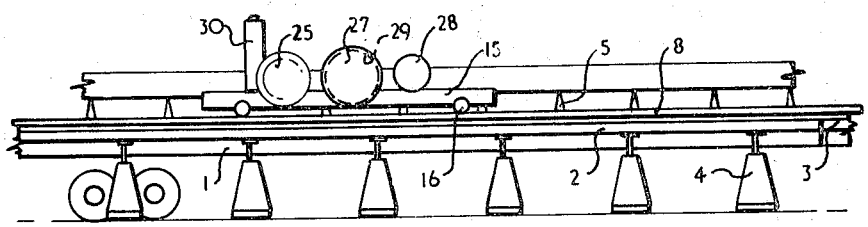
FIGS. 2 and 3 are a side and end elevation thereof respectively.
Figure 3:
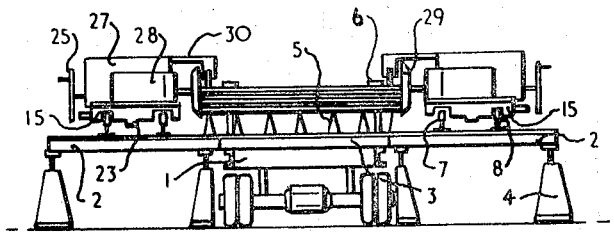

As indicated hereinbefore this milling machine has been especially designed for use with a portable pipe mill, nevertheless, and quite apart from the foregoing, the invention contemplates novel plate edge preparation equipment incorporating some important major improvements, e.g., it utilizes two spaced millers movable the entire length of the plate to simultaneously machine both opposite sides, it can mill both sides of laminated plate stacked 6 inches thick at one time, the transverse spacing of the milling heads is adjustable and even the angle of the cutting tools may be varied to produce bevelled edges.

In the specific embodiment of the portable type of milling machine illustrated herein, the various separable components are assembled on a milling machine platform comprising basically a tandem-axle semi-trailer vehicle 1, with a side wing 2 on each side and end extensions 3 front and rear. Such an expanded platform is levelled and firmly supported on a plurality of large jacks 4 of the usual outrigger type.

A plate support table 5 is centrally arranged on the platform and extends lengthwise thereof, being able to handle plate up to 14 or 15 feet wide and 50 feet in length, in single sheet or laminate, suitable plate hold-downs 6 being provided at the ends. The steel may be lowered on to the table by a magnetic crane, aligning one edge and one end against suitably positioned bumper stops.

Figure 4:
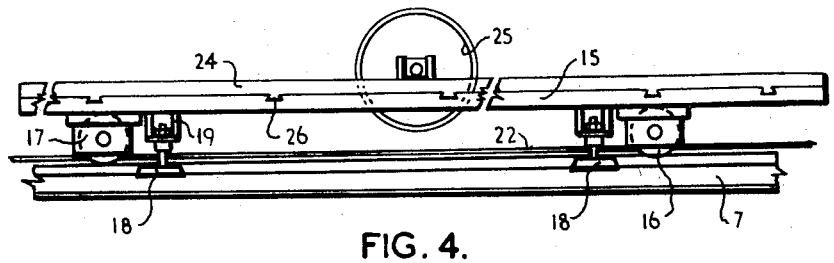
FIGS. 4 and 5 are enlarged side and end elevations of the rail-mounted milling head carriage.
Figure 5:
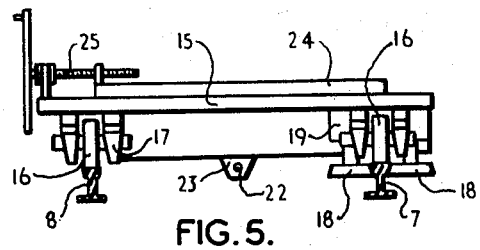
Figure 6:
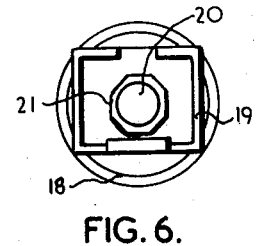
FIGS. 6 and 7 are further enlarged plan view and side elevation respectively of the carriage guide wheel assembly.
Figures 8, 9:
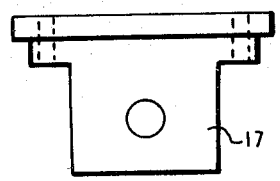
FIGS. 8 and 9 are side and end elevations of the carriage axle bearings.
Figure 7:
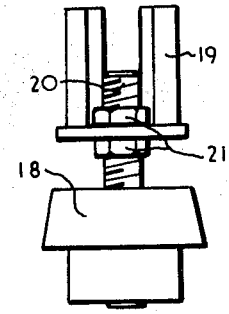
Figure 10:
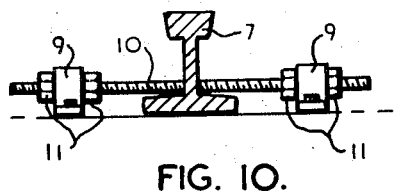
FIG. 10 is an end view of the rail trueing adjuster.

A pair of rails 7 and 8 runs along the platform for the full length thereof on each side of the table 5. These rails are set at the desired spacing for the width of plate to be milled. The inner rail 7 of each pair (see FIGS. 4, 5 and 10) is transversely adjustable for trueing to assure square milling for which purpose spaced pairs of bored anchors 9 are secured to the platform on opposite sides of rail 7 and these accommodate aligned threaded rods 10 whose inner ends engage opposite sides of the rail. A pair of nuts 11 threaded on the rods 10 and disposed one on each side of the anchor enables the rail to be moved as required. It will be noted that the sides of the head of rail 7 taper inwardly toward the bottom, to which reference will be made hereafter.

Operable along each pair of rails is a truck or carriage 15 mounted on wheels 16 whose axles are journalled in boxes 17. Confronting pairs of bevelled machined wheels 18 are provided along the inside of the carriage being disposed horizontally to engage the opposite taper sides of the head of rail 7 as shown particularly in FIGS. 4, 5, 6 and 7. Suspended beneath carriage 15 by hangers 19, the bevelled guide wheels 18 are carried on axle shafts 20 whose upper ends are threaded where they pass through the hangers 19 and are vertically adjustable therein by an opposed pair of nuts 21. To propel the carriage, a worm screw shaft 22 that may be motor driven through a transmission gear reducer is located between the rails and passes through a threaded block 23 depending centrally from the underside of the carriage. Separate motors may run the respective worm screw shafts or a synchronized drive may be employed.

Surmounting each carriage 15 is a transversely slidable mill head base 24 adjustable by a hand wheel screw device 25. This base is appropriately connected to the carriage for transverse horizontal movement as by engaging key and keyway joints 26. A milling head 27 secured on the base is driven by a powerful intimate motor 28 alongside and since the motor is moving with the carriage along the rails, it may be supplied with power from a suitable source fed through a ducto-bar electrical pick-up. Carbide cutters 29 are preferably employed with the mill heads although high speed cutters may be used in cases where desired. The cutters are quill shaft movable, being adjustable ± 2 inches. Following the mill head cutter, a roller-equipped plate edge depressor 30 rising from the carriage bears down on the plate to dampen chatter and plate flutter.

Though usually a plate is desired with the edges milled square, some operators like pipe-line plate cut with an edge bevel as much as eight degrees from the vertical. To adjust the present milling machine to cut plate with such a bevelled edge, the platform wings 2 can be lowered at an incline and/or the rails can be shimmed.

From the foregoing description taken in connection with the accompanying drawings, it will be manifest that a milling machine is provided that will fulfil all the necessary requirements of such a device, but many changes could be made in the above description and many apparently widely different embodiments of the invention may be constructed without departing from the spirit or scope of the invention.

What is claimed as new is:

1. A milling machine for plate edge preparation comprising a machine platform, a plate support table thereon, a longitudinally extending pair of parallel rails along each side of said table, a wheel-supported carriage movable along each of said pairs of rails, and a power-driven milling head on each carriage, wherein the inner rail of each pair is transversely adjustable for trueing, being engaged on opposite sides by aligned threaded rods regulated by rail-moving nuts coacting with anchors secured to said platform.

2. A milling machine for plate edge preparation comprising a machine platform, a plate support table thereon, a longitudinally extending pair of parallel rails along each side of said table, a wheel-supported carriage movable along each of said pairs of rails, and a power-driven milling head on each carriage, wherein said platform includes a wheeled vehicle as a main unit and has a side wing on each side and end extensions front and rear, rendering the machine a suitable component for a portable pipe mill.

3. The device according to claim 2, wherein the main unit and wing extensions of said platform are supported on and level-trued by outrigger-type jacks.

4. The device according to claim 1, wherein the head of the inner rail of each pair is tapered inwardly toward the bottom and each said carriage has a confronting pair of horizontally disposed bevelled guide wheels engageable with the opposite sides of the tapered head of the rail and means for vertically adjusting said guide wheels.

* * * * *